(12) United States Patent
Patani et al.

(10) Patent No.: US 9,342,669 B2
(45) Date of Patent: May 17, 2016

(54) SYSTEMS AND METHODS OF LICENSING AND IDENTIFICATION OF VIRTUAL NETWORK APPLIANCES

(71) Applicants: Ritesh Patani, Fremont, CA (US); Chien Cheng, Freemont, CA (US)

(72) Inventors: Ritesh Patani, Fremont, CA (US); Chien Cheng, Freemont, CA (US)

(73) Assignee: Dialogic, Inc., Parsippany, NJ (US)

( * ) Notice: Subject to any disclaimer, the term of this patent is extended or adjusted under 35 U.S.C. 154(b) by 0 days.

(21) Appl. No.: 14/327,813

(22) Filed: Jul. 10, 2014

(65) Prior Publication Data
US 2015/0020069 A1    Jan. 15, 2015

Related U.S. Application Data

(60) Provisional application No. 61/845,128, filed on Jul. 11, 2013.

(51) Int. Cl.
*G06F 9/455* (2006.01)
*G06F 21/10* (2013.01)

(52) U.S. Cl.
CPC ............ *G06F 21/10* (2013.01); *G06F 9/45533* (2013.01); *G06F 9/45558* (2013.01); *G06F 2221/0704* (2013.01)

(58) Field of Classification Search
None
See application file for complete search history.

(56) References Cited

U.S. PATENT DOCUMENTS

| | | | | |
|---|---|---|---|---|
| 2005/0251488 A1* | 11/2005 | Saunders | ............... | G06F 21/121 705/59 |
| 2006/0129788 A1* | 6/2006 | Maeda | ................... | G06F 9/4416 713/1 |
| 2009/0060187 A1* | 3/2009 | Doyle | ................... | H04L 9/3268 380/259 |
| 2009/0063849 A1* | 3/2009 | Doyle | ............... | H04L 29/12839 713/151 |
| 2009/0259834 A1* | 10/2009 | Ramos | ....................... | G06F 8/63 713/1 |
| 2010/0083251 A1* | 4/2010 | McCrory | ................ | G06F 9/455 718/1 |
| 2010/0205303 A1* | 8/2010 | Chaturvedi | ........... | G06F 21/126 709/226 |

(Continued)

FOREIGN PATENT DOCUMENTS

CN    WO 2014101651 A1 *  7/2014    .............. G06F 21/10

*Primary Examiner* — Andrew Nalven
*Assistant Examiner* — Christopher Ruprecht
(74) *Attorney, Agent, or Firm* — Chapin IP Law, LLC

(57) ABSTRACT

Systems and methods of licensing and identification of a virtual network appliance. The systems and methods obtain information specific to an instance of a virtual machine corresponding to the virtual network appliance. The instance of the virtual machine is deployed on a predetermined virtualization platform. The systems and methods can generate an identifier as well as a serial number for the virtual machine based at least on the information specific to the instance of the virtual machine, and generate a license including license data for the virtual network appliance, embedding at least the identifier for the virtual machine in the license data. The information specific to the instance of the virtual machine can include a universally unique identifier (UUID) and at least one virtual media access control (MAC) address for the virtual machine deployed on the predetermined virtualization platform.

20 Claims, 9 Drawing Sheets

(56) References Cited

U.S. PATENT DOCUMENTS

| | | | |
|---|---|---|---|
| 2011/0185355 A1* | 7/2011 | Chawla | G06F 9/5077 718/1 |
| 2011/0238820 A1* | 9/2011 | Matsuoka | G06F 9/5077 709/224 |
| 2012/0110574 A1* | 5/2012 | Kumar | G06F 9/45558 718/1 |
| 2012/0216269 A1* | 8/2012 | Yeung | G06F 21/10 726/11 |
| 2012/0222028 A1* | 8/2012 | Nakajima | H04L 29/12254 718/1 |
| 2012/0287931 A1* | 11/2012 | Kidambi | H04L 49/602 370/392 |
| 2013/0276068 A1* | 10/2013 | Alwar | G06F 21/53 726/4 |
| 2014/0007232 A1* | 1/2014 | Abidi | H04L 63/1483 726/22 |
| 2014/0040440 A1* | 2/2014 | Christopher | H04L 61/6022 709/220 |
| 2014/0201733 A1* | 7/2014 | Benny | G06F 9/455 718/1 |
| 2014/0208317 A1* | 7/2014 | Nakagawa | G06F 9/45533 718/1 |
| 2014/0229933 A1* | 8/2014 | Kanungo | G06F 9/45558 718/1 |
| 2014/0282889 A1* | 9/2014 | Ishaya | H04L 63/08 726/4 |
| 2014/0283090 A1* | 9/2014 | Angelov | G06F 21/10 726/26 |
| 2014/0359620 A1* | 12/2014 | Van Kerkwyk | H04L 41/042 718/1 |
| 2014/0376556 A1* | 12/2014 | Haggar | H04L 61/2076 370/400 |
| 2015/0326549 A1* | 11/2015 | Zeng | G06F 21/10 726/7 |

\* cited by examiner

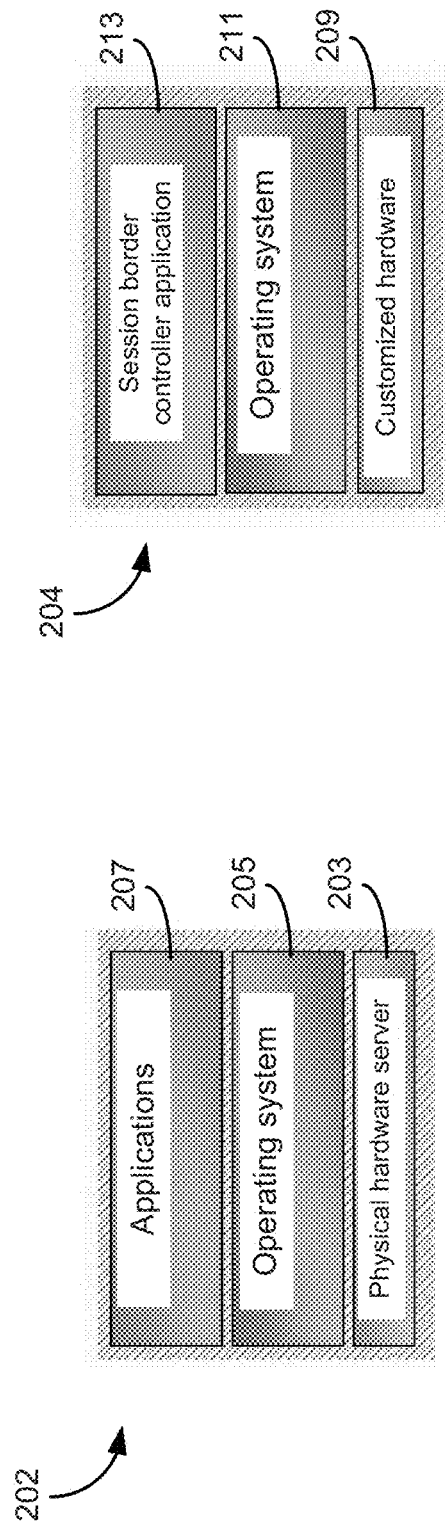

SYSTEMS AND METHODS OF LICENSING AND IDENTIFICATION OF VIRTUAL NETWORK APPLIANCES

CROSS REFERENCE TO RELATED APPLICATIONS

This application claims benefit of the priority of U.S. Provisional Patent Application No. 61/845,128 filed Jul. 11, 2013 entitled SYSTEMS AND METHODS OF LICENSING AND IDENTIFICATION OF VIRTUAL NETWORK APPLIANCES.

TECHNICAL FIELD

The present application relates generally to the deployment of virtual network appliances in a virtualized environment, and more specifically to systems and methods of licensing and/or identification of virtual network appliances after their deployment in a virtualized environment.

BACKGROUND

Conventional systems and methods of licensing and/or identification of virtual network appliances deployed in a virtualized environment are known that can include delivering a software application or image for a respective virtual network appliance via specific physical media, and using a unique identifier associated with the specific physical media for licensing and/or identification of the respective virtual network appliance. For example, a software application or image for such a virtual network appliance can be physically delivered in a virtualized environment via a universal serial bus (USB) dongle, and a unique identifier associated with the USB dongle can then be used in the licensing and/or identification of the virtual network appliance. Such licensing can impose certain limitation(s) on the scope and/or duration of use of the virtual network appliance, possibly restricting or otherwise limiting an end-user's ability to assign, redistribute, and/or resell the virtual network appliance, and/or directing how, when, where, and/or for how long the end-user may use the virtual network appliance.

Such conventional systems and methods of licensing and/or identification of virtual network appliances deployed in a virtualized environment have drawbacks, however, in that the use of physical media (such as USB dongles) for delivering software applications or images for the virtual network appliances is generally unsuited for the licensing and/or identification of virtual network appliances deployed via electronic data transmission in certain virtualized environments, such as virtualized cloud-based data center environments and other virtualized cloud computing environments.

SUMMARY

In accordance with the present application, systems and methods are disclosed for licensing and/or identification of virtual network appliances after their deployment in a virtualized environment. The disclosed systems and methods can be used for the licensing and/or identification of virtual network appliances deployed via electronic data transmission in virtualized environments, such as virtualized cloud-based data center environments or any other suitable virtualized cloud computing environments.

As employed herein, the term "virtual network appliance" refers to a virtual machine image configured to run on a virtualization platform implemented on one or more physical computerized platforms. For example, such virtual network appliances can correspond to virtual session border controllers, virtual session security gateways, virtual media gateways, or any other suitable virtual implementations of hardware-based telecommunications equipment, nodes, components, or collections of functions. The term "virtual machine" (VM) is employed herein to refer to a software implementation of a computer that has its own operating system (also referred to herein as a/the "guest operating system"), and can execute computer programs like a physical computer. Further, the term "virtual machine image" or "VM image" is employed herein to refer to a computer file that contains a virtual disk having a bootable guest operating system for a VM installed on it. The term "virtual disk" is employed herein to refer to a software implementation of a physical disk drive.

In one aspect, a system for licensing and identification of a virtual network appliance in a virtualized environment involves a client computer operative to receive, over a network, a representation of the virtual network appliance as a VM image instance. The system includes a licensing server operative to receive, over the network from the client computer, a request for a license for the virtual network appliance. The request includes identification information for the virtual network appliance, including one or more of a virtual media access control (MAC) address and a unique identifier for the VM image instance received at the client computer. The licensing server can extract one or more of the virtual MAC address and the unique identifier for the VM image instance from the identification information, and generate at least a VM identifier for the VM image instance using one or more of the virtual MAC address and the unique identifier for the VM image instance. The licensing server can further generate the license for the virtual network appliance, and embed at least the VM identifier in the license data. The licensing server can then send, over the network, the license including the VM identifier embedded in the license data to the client computer. In an exemplary aspect, the VM identifier embedded in the license data is referred to as a "licensed VM identifier". The licensing server can further generate what is referred to herein as a "runtime VM identifier" for the VM image instance using at least selected portions of the virtual MAC address and the unique identifier for the VM image instance, and subsequently verify the licensed VM identifier against the runtime VM identifier.

By generating a license for a virtual network appliance that contains a sufficient amount of information (e.g., at least the VM identifier obtained from the virtual MAC address(es) and the unique identifier for the VM image instance) to effectively tie the virtual network appliance to a specific virtualization platform upon which the virtual network appliance is deployed, proper verification of the license for the virtual network appliance can be advantageously achieved in a virtualized environment.

Other features, functions, and aspects of the invention will be evident from the Detailed Description that follows.

BRIEF DESCRIPTION OF THE DRAWINGS

The accompanying drawings, which are incorporated in and constitute a part of this specification, illustrate one or more embodiments described herein, and, together with the Detailed Description, explain these embodiments. In the drawings:

FIG. 2a is a block diagram of an exemplary physical network appliance;

FIG. 2b is a block diagram of an exemplary session border controller implemented as a physical network appliance;

DETAILED DESCRIPTION

The disclosure of U.S. Provisional Patent Application No. 61/845,128 filed Jul. 11, 2013 entitled SYSTEMS AND METHODS OF LICENSING AND IDENTIFICATION OF VIRTUAL NETWORK APPLIANCES is hereby incorporated herein by reference in its entirety.

Systems and methods are disclosed for licensing and/or identification of virtual network appliances after their deployment in a virtualized environment. The disclosed systems and methods can be used in the licensing and/or identification of virtual network appliances deployed via electronic data transmission in virtualized environments such as virtualized cloud-based data center environments, or any other suitable virtualized cloud computing environments.

Figure 1:
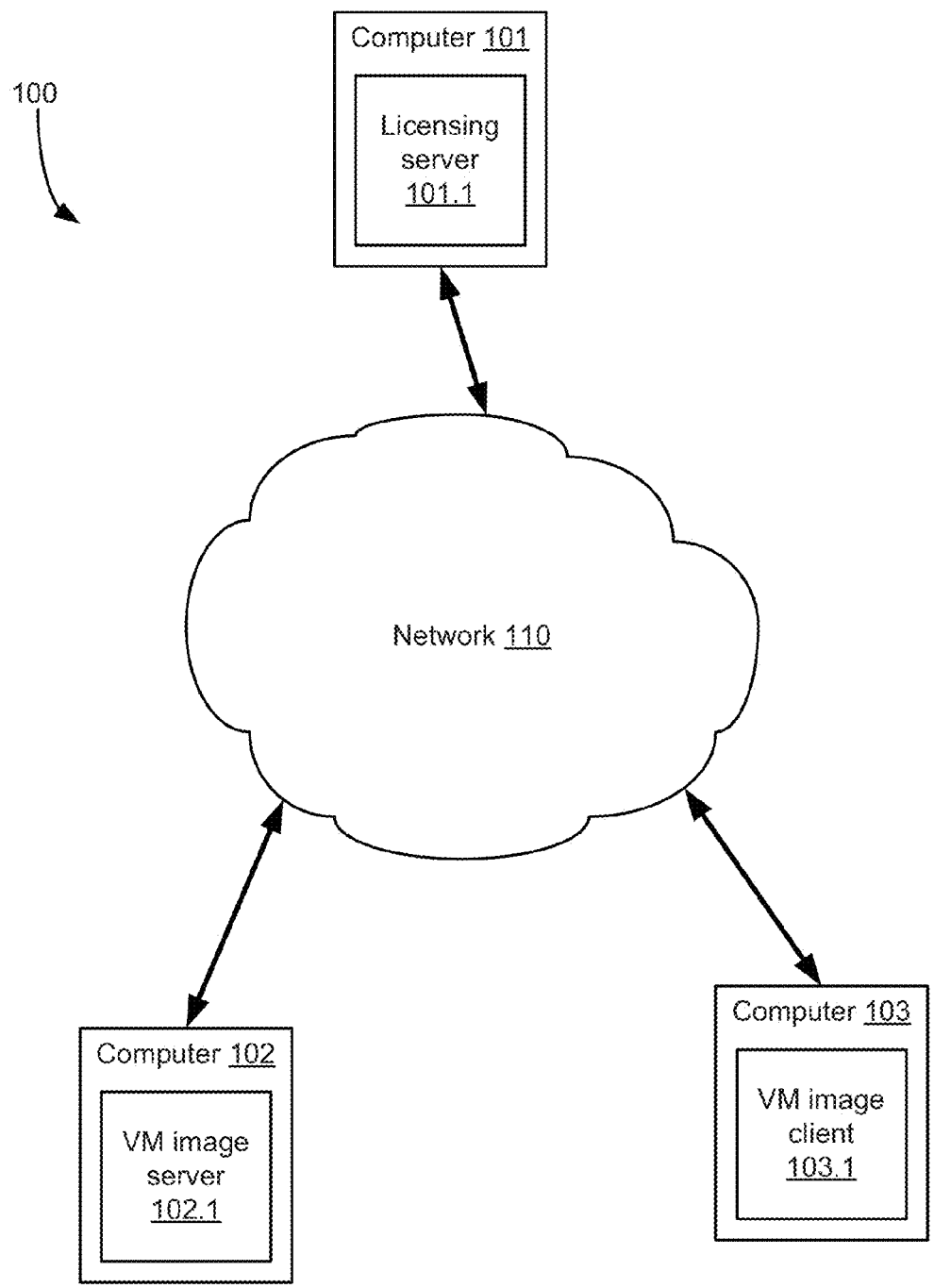
FIG. 1 is a block diagram of an exemplary system for licensing and/or identification of virtual network appliances after their deployment, in accordance with the present application.

FIG. 1 depicts an illustrative embodiment of an exemplary system 100 in which one or more virtual network appliances may be deployed, in accordance with the present application. As shown in FIG. 1, the system 100 includes a plurality of physical computerized platforms, such as a first computer 101, a second computer 102, and a third computer 103 (or any other suitable number of computers or other computerized platforms) communicably coupled to one another by at least one network 110. In this illustrative embodiment, the first computer 101 can transmit, over the network 110, at least one virtual machine (VM) image to a server 102.1 (such a server also referred to herein as a/the "VM image server") running on the second computer 102. Further, the VM image server 102.1 on the second computer 102 can transfer at least one instance of the VM image (also referred to herein as a/the "VM image instance(s)") to a client 103.1 (such a client also referred to herein as a/the "VM image client") running on at least one additional computer, such as the third computer 103. The VM image server 102.1 and the VM image client 103.1 running on the second computer 102 and the third computer 103, respectively, can each include at least one processor operative to execute at least one computer program out of at least one memory for performing various tasks (such as VM image encoding, VM image decoding, VM image streaming, VM image packing, VM image unpacking, etc.) for or otherwise in furtherance of accomplishing the deployment of the VM image instance on at least the third computer 103.

Once the VM image instance is deployed on the third computer 103, the third computer 103 can execute at least one software application provided with the VM image instance to generate a unique system identifier for a virtual network appliance corresponding to the VM image instance. For example, the unique system identifier can be a string of bytes (e.g., a string of characters) containing system information (also referred to herein as a/the "system information string") for the virtual network appliance, and/or any other suitable information in any other suitable format. In this illustrative embodiment, the system information string can be generated using at least one virtual media access control (MAC) address or a portion(s) of the virtual MAC address(es), as well as a universally unique identifier (also referred to herein as a/the "system UUID") or a portion(s) of the system UUID for the VM image instance deployed on the third computer 103.

To request a license for the virtual network appliance corresponding to the VM image instance deployed on the third computer 103, an end-user can transmit, over the network 110 from the third computer 103, the unique system identifier for the virtual network appliance to a licensing server 101.1, which can be implemented to run on the first computer 101 or any other suitable computer within the system 100. Having received the unique system identifier, the licensing server 101.1 can extract, from the unique system identifier, the virtual MAC address(es) and the system UUID for the VM image instance deployed on the third computer 103, and, using one or more of the virtual MAC address(es) and the system UUID, generate one or both of a serial number and a virtual machine identifier (also referred to herein as a/the "virtual machine ID") for the VM image instance deployed on the third computer 103. The licensing server 101.1 can then generate a license for the virtual network appliance, embedding at least the virtual machine ID (i.e., the "licensed virtual machine ID") in the license data.

To verify the license for the virtual network appliance corresponding to the VM image instance deployed on the third computer 103, the licensing server 101.1 (or the third computer 103 using the software application provided with the VM image instance) can compute, generate, or otherwise obtain the virtual machine ID (i.e., the "runtime virtual machine ID") for the VM image instance deployed on the third computer 103 using the virtual MAC address(es) and the system UUID of the VM image instance, and verify the licensed virtual machine ID embedded in the license data against the runtime virtual machine ID. If the licensed virtual machine ID matches the runtime virtual machine ID, then it can be concluded that the license for the virtual network appliance has been successfully verified. If the licensed virtual machine ID does not match the runtime virtual machine ID, then it can be concluded that the license for the virtual network appliance has not been verified. Because the license for the virtual network appliance contains a sufficient amount of information (e.g., the virtual machine ID computed, generated, or otherwise obtained from one or more virtual MAC address(es) and the system UUID of the corresponding VM image instance) to tie the corresponding VM image instance to a specific virtualization platform, such as the virtualization platform implemented on the third computer 103, proper verification of the license for the virtual network appliance can be achieved.

It is noted that physical network appliances (such as physical session border controllers, physical media gateways, etc.) are typically licensed per installation of the respective physical network appliances. Further, software applications running on such physical network appliances are typically licensed by tying or otherwise associating corresponding license keys to/with one or more unique properties of the respective physical network appliances, such as the MAC addresses of on-board network interface cards (NICs), or any other suitable unique properties of the physical network appliances. In addition, for support and/or maintenance of such physical network appliances, the respective physical network appliances are typically assigned and/or labeled with serial numbers during assembly, before the physical network appliances are shipped to end-users.

FIG. 2a depicts an exemplary physical network appliance 202. As shown in FIG. 2a, the physical network appliance 202 includes the physical hardware of a server 203, which is operative to execute an operating system (OS) 205, as well as one or more software applications 207 in an application layer of the physical network appliance 202.

FIG. 2b depicts an exemplary session border controller 204 (also referred to herein as a/the "physical session border controller") implemented as a physical network appliance. As shown in FIG. 2b, the physical session border controller 204 includes customized hardware 209 for implementing a physical server computer. The customized hardware 209 is operative to execute an OS 211, as well as at least one session border controller application 213 in an application layer of the physical session border controller 204. It is noted that the physical session border controller 204 can have various other physical components, such as one or more Ethernet ports having their own unique MAC addresses. In addition, the physical session border controller 204 can be assigned and/or labeled with a serial number during assembly, prior to its shipment to an end-user.

Figure 2C:
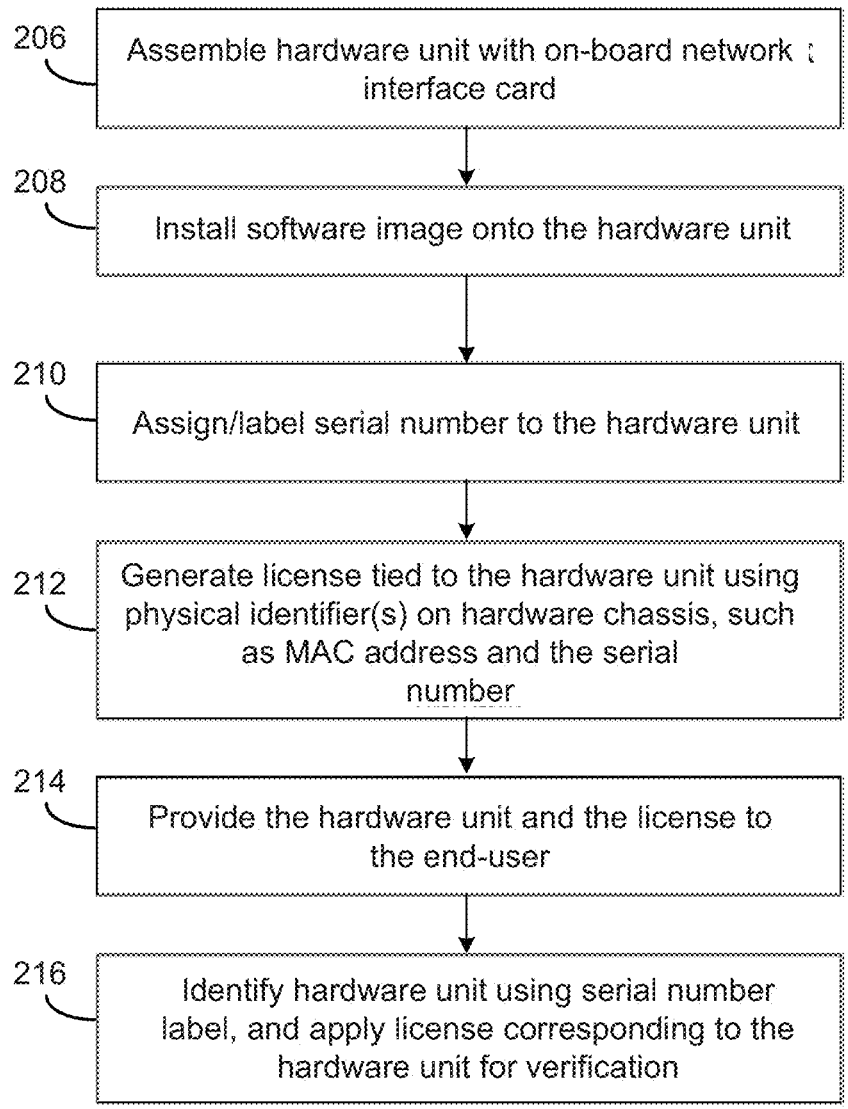
FIG. 2c is a flow diagram of an exemplary method of assembly and licensing of the session border controller of FIG. 2b implemented as a physical network appliance.

FIG. 2c depicts an exemplary method of assembly and licensing of the physical session border controller 204 (see FIG. 2b), which, as described above, is implemented as a physical network appliance. In the method of FIG. 2c, a serial number and/or one or more MAC addresses are used to tie or otherwise associate a license for a software application or image installed on the physical session border controller 204 to/with the specific hardware (also referred to herein as the "hardware unit") of the session border controller 204.

As depicted in block 206 (see FIG. 2c), the hardware unit is assembled with an on-board network interface card (NIC). As depicted in block 208, a software application or image is installed on the hardware unit. As depicted in block 210, the hardware unit is assigned and/or labeled with a serial number. As depicted in block 212, a license for the software application or image is generated, tied to, associated with, or otherwise obtained for the hardware unit, using one or more physical identifiers on a chassis of the hardware unit, such as the serial number and/or the MAC address of the on-board NIC. As depicted in block 214, the hardware unit and the license for the software application or image are provided to an end-user. As depicted in block 216, the hardware unit is identified using the serial number, and the license is applied to the hardware unit for verification. Because the license for the software application or image can be tied to or otherwise associated with the hardware unit using the serial number of the hardware unit, as well as the MAC address of its on-board NIC, proper verification of the license can be achieved.

In a virtualized environment, VM image instances can have unique identifiers assigned to them and/or their associated virtual resources. It is noted, however, that, unlike serial numbers that are assigned to physical network appliances (such serial numbers typically being assigned to the physical network appliances before their shipment to end-users), such unique identifiers are generally unavailable for use until after deployment of the VM image instances within the virtualized environment. Moreover, such unique identifiers of VM image instances are often under the control of administrators of such virtualized environments, who may, at times, either intentionally or inadvertently change and/or make copies of the unique identifiers, causing the use of such unique identifiers in the licensing of virtual network appliances heretofore to be problematic. In addition, because VM image instances can be delivered for deployment through various different channels (e.g., by downloading over a network) as well as various different media (e.g., via physical media such as compact disks (CDs), digital video disks (DVDs), universal serial buses (USBs)), and are not subject to assembly processes like hardware units, the use of such unique identifiers in the identification of virtual network appliances after their deployment within the virtualized environment has likewise heretofore been problematic.

Figures 3A, 3B:
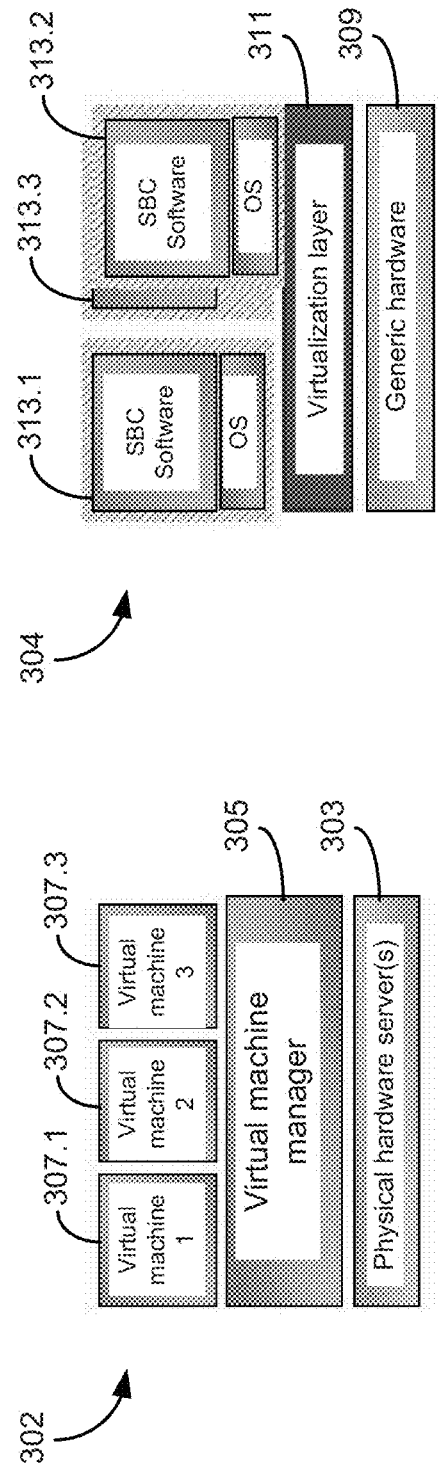
FIG. 3a is a block diagram of an exemplary virtual network appliance.
FIG. 3b is a block diagram of an exemplary session border controller implemented as a virtual network appliance.

FIG. 3a depicts an exemplary virtualized environment 302 for one or more virtual network appliances, in which the underlying hardware layer of the virtual network appliance(s) has been abstracted out. As shown in FIG. 3a, the virtualized environment 302 is implemented using a virtual machine (VM) manager 305 (e.g., a hypervisor), and three virtual machines (VMs) (or any other suitable number of VMs), namely, a first VM 307.1, a second VM 307.2, and a third VM 307.3. The VM manager 305 is installed directly on the physical hardware of at least one server 303. For example, the physical hardware of the server 303 can include one or more processors, one or more memories, one or more network interface cards (NICs), and/or any other suitable hardware components. The VMs 307.1, 307.2, 307.3 are each instantiated on the VM manager 305, and are each configured to provide a software abstraction of the respective VM, including its own set of virtual hardware resources and guest operating system (guest OS), and one or more software applications. For example, the VMs 307.1, 307.2, 307.3 can each include one or more virtual processors, one or more virtual memories, one or more virtual drivers, one or more virtual disks, etc., for controlling and/or communicating with the various components of the physical hardware of the server 303.

FIG. 3b depicts an exemplary virtualized environment 304 for one or more instances 313.1, 313.2, 313.3 of an exemplary session border controller (SBC) (each instance of the SBC also referred to herein as a/the "virtual SBC instance"), in which each virtual SBC instance 313.1, 313.2, 313.3 corresponds to a virtual network appliance. As shown in FIG. 3b, the virtualized environment 304 includes a virtualization layer 311, which can include a VM manager or hypervisor installed directly on generic hardware 309 of a physical computer. Further, the virtual SBC instances 313.1, 313.2, 313.3 are each instantiated on the VM manager within the virtualization layer 311, and are each configured to provide a software abstraction of a VM, including its own set of virtual hardware resources and guest OS, and one or more software applications.

It is noted that each virtual SBC instance 313.1, 313.2, 313.3 may be delivered for deployment within the virtualized environment 304 through various different channels and media, and might not have any physical attributes associated with it. Further, each virtual SBC instance 313.1, 313.2, 313.3 might be configured to run on any generic hardware that meets certain minimal specifications. In such a virtualized environment, the disclosed systems and methods can be employed to license and/or identify each of the virtual SBC instances 313.1, 313.2, 313.3, each of which may be running within the virtualized environment with its own specific configuration.

Upon its deployment within the virtualized environment 304, each virtual SBC instance 313.1, 313.2, 313.3 is typically assigned one or more unique identifiers that can serve as a starting point for generating a unique system identifier for the virtual network appliance that corresponds to the respective virtual SBC instance 313.1, 313.2, or 313.3. For example, such unique identifiers can include one or more virtual MAC addresses and/or a system UUID, which can be acquired using OS-based utilities. Such a unique system identifier for a virtual network appliance, generated from the unique identifiers of its corresponding virtual SBC instance 313.1, 313.2, or 313.3, can be used for licensing and/or identification of the virtual network appliance, as well as for generating a serial number for the virtual network appliance.

Figure 3C:
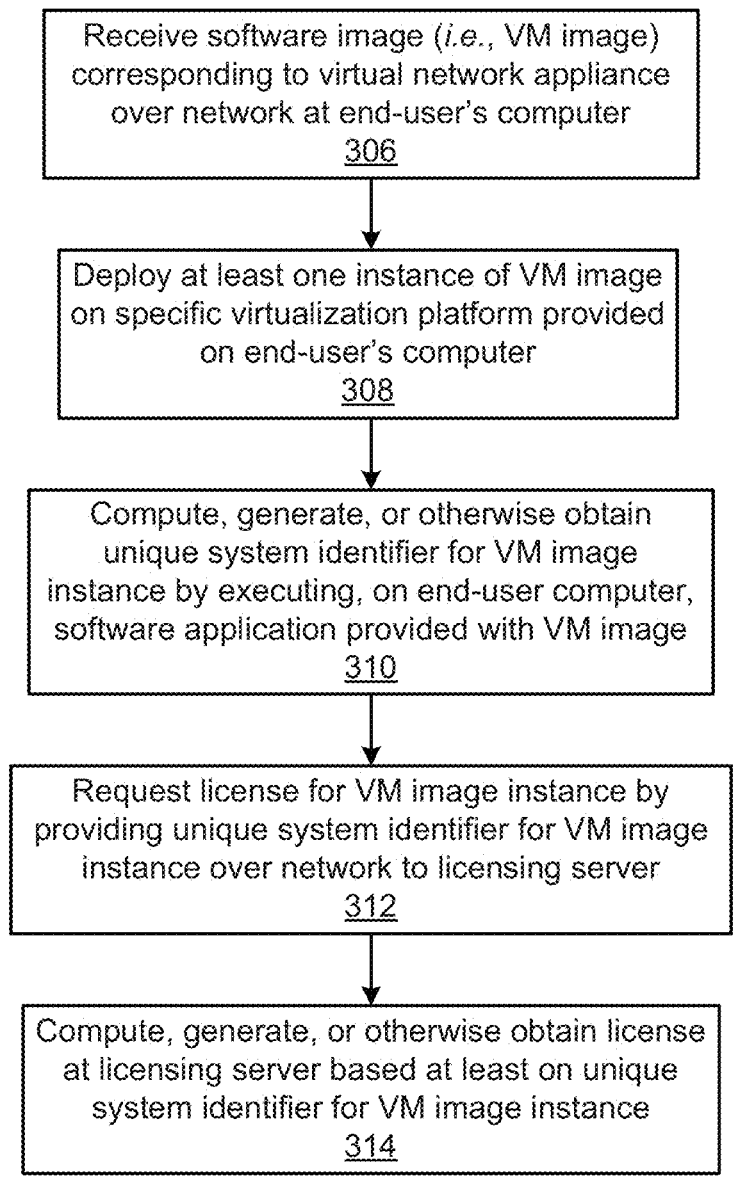
FIG. 3c is a flow diagram of an exemplary method of licensing and/or identification of the virtualized session border controller of FIG. 3b after its deployment.

FIG. 3c depicts an exemplary method of licensing and/or identification of a virtual network appliance, such as the virtual SBC instance 313.1, 313.2, or 313.3 implemented within the virtualized environment 304 (see FIG. 3b). As depicted in block 306, a software image (i.e., a VM image) corresponding to the virtual network appliance is received, over a network, at an end-user's computer. As depicted in block 308, at least one instance of the VM image is deployed on a specific virtualization platform provided on the end-user's computer. As depicted in block 310, a unique system identifier for the VM image instance is computed, generated, or otherwise obtained by executing, on the end-user computer, a software application provided with the VM image. As depicted in block 312, a license for the VM image instance is requested by the end-user by providing the unique system identifier for the VM image instance over the network to a licensing server. As depicted in block 314, the license is computed, generated, or otherwise obtained at the licensing server based at least on the unique system identifier for the VM image instance.

Such computation or generation of a unique system identifier for a VM image instance, using the system UUID and/or one or more virtual MAC addresses associated with the VM image instance, will be further understood with reference to the following illustrative example. In this example, the format of an exemplary system UUID is 128-bit number in the canonical form of 32 hexadecimal digits, representing 36 characters (i.e., five groups of 8-4-4-4-12 characters, resulting in 32 alphanumeric characters plus 4 hyphens). For example, such an exemplary system UUID can be expressed as 564D0C35-3775-98C5-28FD-F7A722040C12. Further, in this example, the format of an exemplary virtual MAC address for the VM image instance is 6 bytes in six groups of 2 hexadecimal digits separated by hyphens or colons. For example, the VM image instance can be assigned a plurality of virtual MAC addresses 0, 1, and 2 (also referred to herein as "MAC-1", "MAC-2", and "MAC-3"), which can be expressed as 00:50:56:B3:95:DB, 00:50:56:B3:D1:2D, and 00:50:56:B3:5E:E8, respectively. It is noted that the first three groups of 2 hexadecimal digits in each of MAC-1, MAC-2, and MAC-3 can correspond to an organization unique identifier (OUI) from a specific vendor, and the last three groups of 2 hexadecimal digits can be network interface specific digits within the same OUI.

In this example, system information for uniquely identifying the VM image instance can be obtained by acquiring the system UUID and/or the virtual MAC addresses for the VM image instance. The system information can then be encoded into 64 hexadecimal digits comprising the system UUID, MAC-0, MAC-1, and MAC-2 concatenated with a checksum value to assure the integrity of the system information. The 64 hexadecimal digits can also be rearranged in a predetermined order to avoid having end-users recognize the origins of the system information in the hexadecimal digits.

To provide for a more user-friendly serial number for the virtual network appliance corresponding to the VM image instance, as well as enhance the readability of the serial number, selected bytes, characters, and/or digits of the system UUID (e.g., 20 hexadecimal digits, or any other suitable number of hexadecimal digits) can be used to generate the serial number in the form of 10 decimal digits, or any other suitable number of decimal digits. Further, at least one character, such as "V", "W", "X", or any other suitable character, can be added as a prefix and/or a suffix to the 10-digit serial number. Such a serial number for the virtual network appliance can be more easily viewed by an end-user via a graphical user interface (GUI) associated with the virtual network appliance, and can likewise be more easily viewed and/or verified by human operators at the licensing server.

Figure 4:
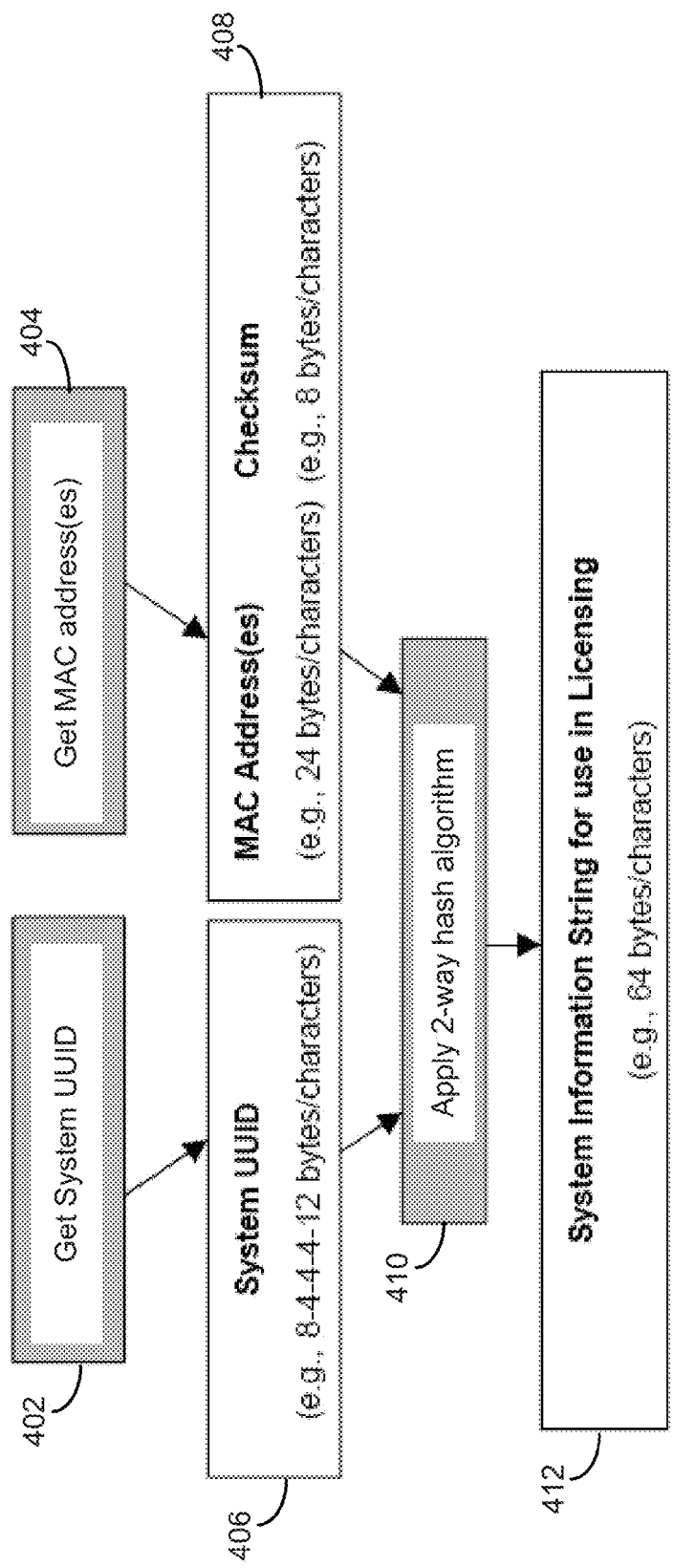
FIG. 4 is a flow diagram illustrating the generation of an exemplary system information string for use in the method of FIG. 3c.

FIG. 4 depicts the generation of an exemplary system information string for use in licensing and/or identification of a virtual network appliance, such as the virtual SBC instance 313.1, 313.2, or 313.3 implemented within the virtualized environment 304 (see FIG. 3b). Such a system information string can be generated, after deployment of a VM image instance corresponding to the virtual network appliance, by executing a software application provided with the deployed VM image instance. As depicted in block 402, the system UUID for the VM image instance is acquired, and, as depicted in block 404, one or more virtual MAC addresses for the VM image instance are likewise acquired. As depicted in block 406, such a system UUID can be represented by 36 bytes/characters, i.e., five groups of 8-4-4-4-12 bytes/characters plus 4 hyphens, or any other suitable number of bytes/characters. As depicted in block 408, such virtual MAC addresses can each be represented by 24 bytes/characters, or any other suitable number of bytes/characters. As further depicted in block 408, a checksum value, for use in assuring the integrity of the system information string, can be represented by 8 bytes/characters, or any other suitable number of bytes/characters. As depicted in block 410, a 2-way hash algorithm, or any other suitable 2-way data altering algorithm, can be applied to at least the system UUID and/or the MAC addresses for generating, as depicted in block 412, the exemplary system information string, which can be represented by 64 bytes/characters or any other suitable number of bytes/characters.

Figure 5A:
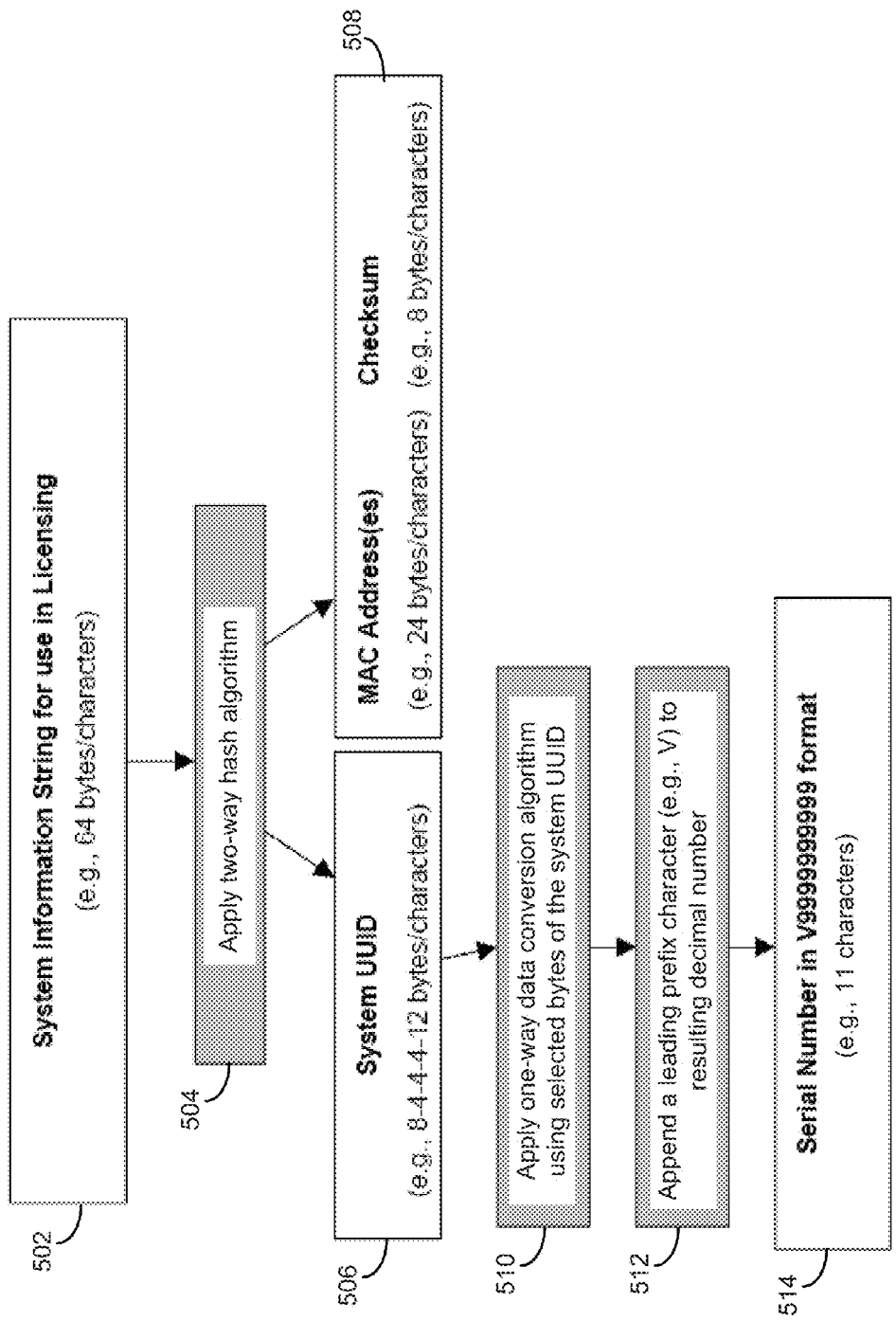
FIG. 5a is a flow diagram illustrating the generation of an exemplary serial number for the virtualized session border controller of FIG. 3b, the serial number being generated from the system information string of FIG. 4.

FIG. 5a depicts the generation of an exemplary serial number for a virtual network appliance such as the virtual SBC instance 313.1, 313.2, or 313.3 implemented within the virtualized environment 304 (see FIG. 3b), in which the serial number is generated from the exemplary system information string depicted in FIG. 4. Upon receipt at a licensing server of an end-user's request for a license for the virtual network appliance, the licensing server can generate such a serial number using the system information string provided with the request. As depicted in blocks 502 and 504, the 2-way hash algorithm (or any other suitable 2-way data altering algorithm) (see also block 410 of FIG. 4) is applied to the system information string to extract the system UUID (see block 506), the virtual MAC address(es) (see block 508), and the checksum value (see also block 508) from the system information string. As depicted in block 510, any suitable one-way data conversion algorithm can be applied to at least selected bytes/characters/digits of the system UUID, thereby generating a decimal number having 10 digits, or any other suitable number of digits. Further, as depicted in block 512, a leading prefix character (and/or a trailing suffix character), such as the character "V" (or any other suitable character), can be appended to the 10-digit decimal number to obtain the serial number having 11 characters (e.g., the character, V, plus the 10 decimal digits; see block 514), or any other suitable number of characters.

Figure 5B:
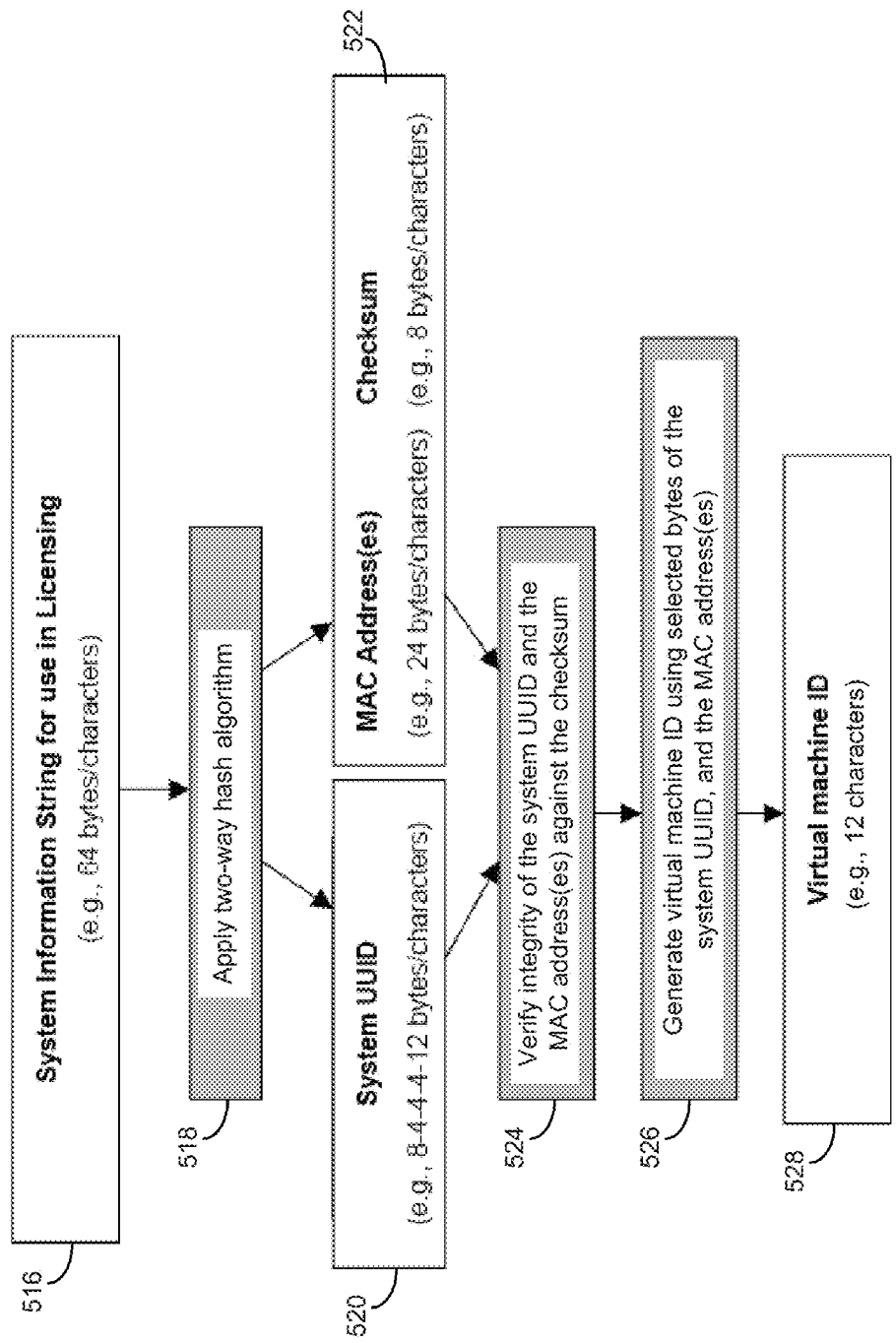
FIG. 5b is a flow diagram illustrating the generation of an exemplary virtual machine identifier for the virtualized session border controller of FIG. 3b, the virtual machine identifier being generated from the system information string of FIG. 4.

FIG. 5b depicts the generation of an exemplary virtual machine ID for a virtual network appliance such as the virtual SBC instance 313.1, 313.2, or 313.3 implemented within the virtualized environment 304 (see FIG. 3b), in which the virtual machine ID is generated from the exemplary system information string depicted in FIG. 4. As depicted in blocks 516 and 518, the 2-way hash algorithm (or any other suitable 2-way data altering algorithm) (see also block 410 of FIG. 4) is applied to the system information string to extract the system UUID (see block 520), the virtual MAC address(es) (see block 522), and the checksum value (see also block 522) from the system information string. As depicted in block 524, the integrity of the system UUID and the virtual MAC address(es) is verified against the checksum value. As depicted in block 526, the virtual machine ID is generated using the selected bytes/characters/digits of the system UUID and the virtual MAC address(es). As depicted in block 528, the resulting virtual machine ID can have 12 characters, or any other suitable number of characters.

Figure 6:
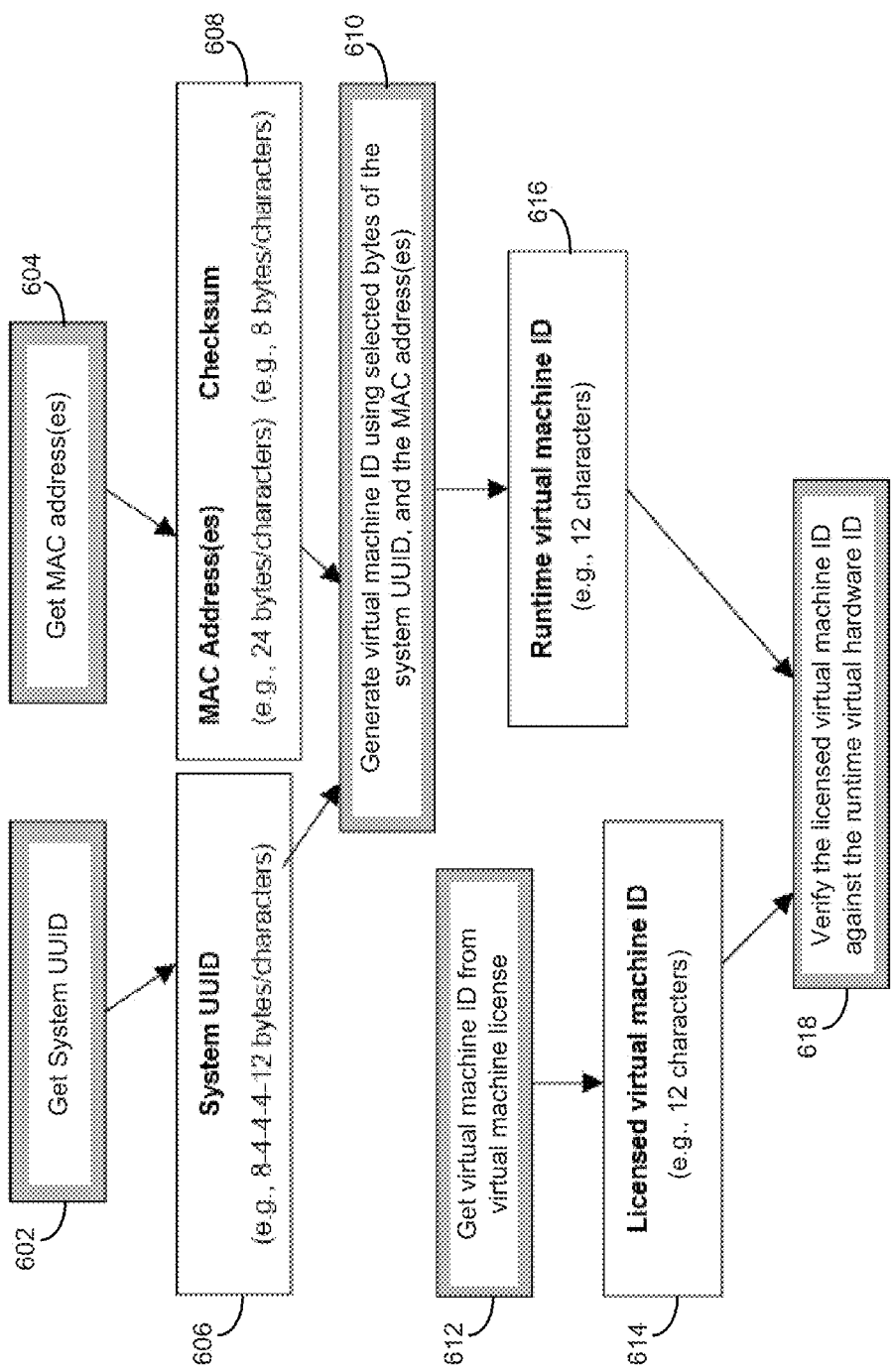
FIG. 6 is a flow diagram illustrating the verification of an exemplary license associated with the virtualized session border controller of FIG. 3b, using the virtual machine identifier of FIG. 5b.

FIG. 6 depicts the verification of an exemplary license associated with a virtual network appliance such as the virtual SBC instance 313.1, 313.2, or 313.3 implemented within the virtualized environment 304 (see FIG. 3b). For example, such verification of the license for the virtual network appliance can be performed at the licensing server. As depicted in block 602, the system UUID (see also block 606) for a VM image instance that corresponds to the virtual network appliance is acquired, and, as depicted in block 604, one or more virtual MAC addresses (as well as a checksum value; see block 608) for the VM image instance are likewise acquired. As depicted in block 610, the runtime virtual machine ID (see also block 616) is generated from the selected bytes/characters/digits of the system UUID and the MAC address(es). Further, as depicted in block 612, the licensed virtual machine ID (see also block 614) for the VM image instance is obtained from the license for the virtual network appliance. As depicted in block 618, the licensed virtual machine ID is verified against the runtime virtual machine ID. If the licensed virtual machine ID matches the runtime virtual machine ID, then it can be concluded that the license for the virtual network appliance has been successfully verified. If the licensed virtual machine ID does not match the runtime virtual machine ID, then it can be concluded that the license for the virtual network appliance has not been verified.

Having described the above exemplary embodiments of the disclosed systems and methods, other alternative embodiments or variations may be made. For example, with reference to block 612 of FIG. 6, it was described herein that the licensed virtual machine ID for a VM image instance can be obtained from the license for a corresponding virtual network appliance. In an alternative embodiment, the licensed virtual machine ID can be embedded in the license data in an encrypted form. Further, the serial number for the virtual network appliance can be used, in conjunction with any suitable symmetric encryption algorithm, as an encryption key for extracting the licensed virtual machine ID from the license data. Because the encryption key (e.g., the serial number) is part of the data derived from the system UUID (see, e.g., blocks 506, 510, 512, and 514 of FIG. 5a), the validity of the license generated for a specific deployment of the virtual network appliance is assured.

It will be apparent that one or more embodiments described herein may be implemented in many different forms of software and/or hardware. For example, one or more embodiments described herein may include suitable configurations of one or more computerized devices, hardware processors, and/or the like to carry out and/or support any or all of the systems and/or methods described herein. Further, one or more computerized devices, processors, digital signal processors, etc., may be programmed and/or configured to implement the systems and methods described herein.

It will be appreciated by those of ordinary skill in the art that further modifications to and variations of the above-described systems and methods may be made without departing from the inventive concepts disclosed herein. Accordingly, the invention should not be viewed as limited except as by the scope and spirit of the appended claims.

What is claimed is:

1. A method of licensing and identification of a virtual network appliance in a virtualized environment, a representation of the virtual network appliance being received at a client computer over a network as a virtual machine (VM) image instance within the virtualized environment, the method comprising:

receiving, at a licensing server over the network from the client computer, a request for a license for the virtual network appliance, the request including identification information for the virtual network appliance, the identification information including a virtual media access control (MAC) address and a universally unique identifier (UUID) for the VM image instance received at the client computer;

extracting, at the licensing server, the virtual MAC address and the UUID for the VM image instance from the identification information included in the request;

selecting, at the licensing server, one or more portions of the UUID for the VM image instance;

generating, at the licensing server, a VM identifier for the VM image instance from at least the virtual MAC address and the one or more selected portions of the UUID for the VM image instance;

generating, at the licensing server, a virtual network appliance identifier for the virtual network appliance from at least the one or more selected portions of the UUID for the VM image instance;

generating, at the licensing server, the license for the virtual network appliance, the license including license data, the generating of the license including embedding at least the VM identifier in the license data; and sending, from the licensing server over the network, the license and the virtual network appliance identifier to the client computer for licensing and identification of the virtual network appliance in the virtualized environment.

2. The method of claim 1 wherein the extracting of the virtual MAC address and the UUID for the VM image instance further includes obtaining a hash of at least the UUID for the VM image instance.

3. The method of claim 1 wherein the UUID for the VM image instance includes one or more of (1) one or more bytes, (2) one or more characters, and (3) one or more digits, and wherein the selecting of the one or more portions of the UUID for the VM image instance includes selecting one or more of (1) one or more bytes, (2) one or more characters, and (3) one or more digits of the UUID for the VM image instance.

4. The method of claim 1 further comprising:
generating a checksum value based at least on the virtual MAC address and the UUID for the VM image instance.

5. The method of claim 4 wherein the generating of at least the VM identifier for the VM image instance includes verifying the virtual MAC address and the UUID for the VM image instance against the checksum value.

6. The method of claim 1 wherein the virtual network appliance identifier is a serial number, and wherein the generating of the virtual network appliance identifier includes performing, at the licensing server, a data conversion on at least the one or more selected portions of the UUID for the VM image instance to obtain the serial number for the virtual network appliance.

7. The method of claim 6 further comprising:
appending, at the licensing server, one of a prefix character and a suffix character to the serial number for the virtual network appliance.

8. The method of claim 1 wherein the generating of the license for the virtual network appliance includes encrypting the VM identifier using the virtual network appliance identifier as an encryption key, and wherein the embedding of the VM identifier in the license data includes embedding the VM identifier in the license data in an encrypted form.

9. The method of claim 8 further comprising:
extracting the VM identifier from the license data using the virtual network appliance identifier as the encryption key in conjunction with a symmetric encryption algorithm.

10. The method of claim 5 wherein the VM identifier embedded in the license data is referred to as a licensed VM identifier, and wherein the method further comprises:
generating, at the licensing server, a runtime VM identifier for the VM image instance from at least the virtual MAC address and the one or more selected portions of the UUID for the VM image instance.

11. The method of claim 10 further comprising:
verifying, at the licensing server, the licensed VM identifier against the runtime VM identifier.

12. A system for licensing and identification of a virtual network appliance in a virtualized environment, a representation of the virtual network appliance being received at a client computer over a network as a virtual machine (VM) image instance within the virtualized environment, the system comprising:
a licensing server including at least one processor operative to execute at least one computer program out of at least one memory:
to receive, over the network from the client computer, a request for a license for the virtual network appliance, the request including identification information for the virtual network appliance, the identification information including a virtual media access control (MAC) address and a universally unique identifier (UUID) for the VM image instance received at the client computer;
to extract the virtual MAC address and the UUID for the VM image instance from the identification information included in the request;
to select one or more portions of the UUID for the VM image instance;
to generate a VM identifier for the VM image instance from at least the virtual MAC address and the one or more selected portions of the UUID for the VM image instance;
to generate a virtual network appliance identifier for the virtual network appliance from at least the one or more selected portions of the UUID for the VM image instance;
to generate the license for the virtual network appliance, the license including license data;
to embed at least the VM identifier in the license data; and
to send, over the network, the license and the virtual network appliance identifier to the client computer for licensing and identification of the virtual network appliance in the virtualized environment.

13. The system of claim 12 wherein the at least one processor is further operative to execute the at least one computer program out of the at least one memory to obtain a hash of at least the UUID for the VM image instance.

14. The system of claim 12 wherein the at least one processor is further operative to execute the at least one computer program out of the at least one memory to generate a checksum value based at least on the virtual MAC address and the UUID for the VM image instance.

15. The system of claim 14 wherein the at least one processor is further operative to execute the at least one computer program out of the at least one memory to verify the virtual MAC address and the UUID for the VM image instance against the checksum value.

16. The system of claim 12 wherein the virtual network appliance identifier is a serial number, and wherein the at least one processor is further operative to execute the at least one computer program out of the at least one memory to perform a data conversion on at least the one or more selected portions of the UUID for the VM image instance to obtain the serial number for the virtual network appliance.

17. The system of claim 15 wherein the VM identifier embedded in the license data is referred to as a licensed VM identifier, and wherein the at least one processor is further operative to execute the at least one computer program out of the at least one memory:
to generate a runtime VM identifier for the VM image instance from at least the virtual MAC address and the one or more selected portions of the UUID for the VM image instance.

18. The system of claim 17 wherein the at least one processor is further operative to execute the at least one computer program out of the at least one memory to verify the licensed VM identifier against the runtime VM identifier.

19. A system for licensing and identification of a virtual network appliance in a virtualized environment including a network, comprising:
a licensing server; and
a virtual machine (VM) image client, the licensing server and the VM image client being communicably coupled to one another by the network,
wherein the VM image client is operative to receive a representation of the virtual network appliance over the network as a VM image instance, and
wherein the licensing server includes at least one first processor operative to execute at least one computer program out of at least one first memory:
to receive, over the network from the VM image client, a request for a license for the virtual network appliance, the request including identification information for the virtual network appliance, the identification information including a virtual media access control (MAC) address and a universally unique identifier (UUID) for the VM image instance received at the VM image client;

to extract the virtual MAC address and the UUID for the VM image instance from the identification information included in the request;

to select one or more portions of the UUID for the VM image instance;

to generate a VM identifier for the VM image instance from at least the virtual MAC address and the one or more selected portions of the UUID for the VM image instance;

to generate a virtual network appliance identifier for the virtual network appliance from at least the one or more selected portions of the UUID for the VM image instance;

to generate the license for the virtual network appliance, the license including license data;

to embed at least the VM identifier in the license data; and to send, over the network, the license and the virtual network appliance identifier to the VM image client for licensing and identification of the virtual network appliance in the virtualized environment.

20. The system of claim 19 wherein at least one software application is provided with the VM image instance received at the VM image client, and wherein the VM image client includes at least one second processor operative to execute the at least one software application out of at least one second memory to generate the identification information for the virtual network appliance by obtaining a hash of the virtual MAC address and the UUID for the VM image instance.

* * * * *